US012717835B2

(12) United States Patent
Yun et al.

(10) Patent No.: US 12,717,835 B2
(45) Date of Patent: Aug. 25, 2026

(54) MACHINE LEARNING-BASED USER-CUSTOMIZED AUTOMATIC PATENT DOCUMENT CLASSIFICATION METHOD, DEVICE AND SYSTEM

(71) Applicant: WERT INTELLIGENCE CO., LTD., Seocho-gu (KR)

(72) Inventors: Jung Ho Yun, Seocho-gu (KR); Jung Hoon Shin, Seocho-gu (KR)

(73) Assignee: WERT INTELLIGENCE CO., LTD., Seoul (KR)

(*) Notice: Subject to any disclaimer, the term of this patent is extended or adjusted under 35 U.S.C. 154(b) by 0 days.

(21) Appl. No.: 18/415,535

(22) Filed: Jan. 17, 2024

(65) Prior Publication Data

US 2024/0152539 A1 May 9, 2024

Related U.S. Application Data

(63) Continuation of application No. 17/489,072, filed on Sep. 29, 2021, now Pat. No. 11,880,400, which is a continuation of application No. PCT/KR2020/004341, filed on Mar. 30, 2020.

(30) Foreign Application Priority Data

Mar. 29, 2019 (KR) ........................ 10-2019-0037299
Mar. 29, 2019 (KR) ........................ 10-2019-0037300

(51) Int. Cl.
*G06F 7/00* (2006.01)
*G06F 16/35* (2019.01)

(52) U.S. Cl.
CPC .................................. *G06F 16/35* (2019.01)

(58) Field of Classification Search
CPC ........ G06F 16/35; G06F 16/355; G06F 16/00; G06F 16/10; G06F 16/313; G06F 16/285; G06F 3/0486; G06F 3/08; G06F 40/205; G06F 40/40; G06F 40/56; G06N 5/02; G06N 20/00
See application file for complete search history.

(56) References Cited

U.S. PATENT DOCUMENTS 5,832,470 A 11/1998 Morita et al.
8,903,752 B1 * 12/2014 Pacovsk .............. G06Q 10/063 709/202
11,030,150 B1 * 6/2021 Sokolov ................. G06F 16/11
(Continued)

FOREIGN PATENT DOCUMENTS

KR 10-2012-0058417 A 6/2012
KR 10-2018-0099402 A 9/2018
(Continued)

*Primary Examiner* — Mohammad A Sana
(74) *Attorney, Agent, or Firm* — Sughrue Mion, PLLC

(57) ABSTRACT

A method for classifying patent documents may include the steps of identifying original patent documents in a patent pool identified according to a search and/or selection input of a user; determining the first patent documents classified in the classification generated by the user, among the original patent documents in the patent pool; outputting an indication for accuracy related to the automatic classification; and performing the automatic classification for second patent document which are not yet classified, among the patent documents in the patent pool.

10 Claims, 13 Drawing Sheets

(56) References Cited

U.S. PATENT DOCUMENTS

| | | | | |
|---|---|---|---|---|
| 11,030,494 | B1 * | 6/2021 | Richbourg | G06F 40/211 |
| 2006/0248094 | A1 | 11/2006 | Andrews et al. | |
| 2011/0270826 | A1 * | 11/2011 | Cha | G06F 16/93 707/723 |
| 2014/0156567 | A1 | 6/2014 | Scholtes | |
| 2016/0253412 | A1 * | 9/2016 | Simard | G06F 3/04842 707/737 |
| 2017/0091545 | A1 * | 3/2017 | Adachi | G06V 30/1983 |
| 2019/0228107 | A1 * | 7/2019 | Trim | G06F 16/90332 |
| 2022/0004545 | A1 | 1/2022 | Arvela et al. | |
| 2022/0027930 | A1 | 1/2022 | Oh | |
| 2024/0361890 | A1 * | 10/2024 | George | G06F 3/04842 |

FOREIGN PATENT DOCUMENTS

| | | | |
|---|---|---|---|
| KR | 10-2018-0116550 | A | 10/2018 |
| KR | 10-2018-0117458 | A | 10/2018 |

* cited by examiner

Patent expiration recommendation list

| No. | Evaluation index | Country | No. | Type | Date | Title of invention |
|---|---|---|---|---|---|---|
| 1 | 7.50 | KR | 1054808 | B1 | 2011.08.01 | Composition for improving Cholesterol |
| 2 | 7.50 | KR | 1592299 | B1 | 2016.02.01 | Construct for biosynthesis of resveratrol glucoside derivatives |
| 3 | 6.60 | KR | 1091151 | B1 | 2011.12.01 | Novel enterobacter sp. strains and Method for stimulating the growth of plant by using them |
| 4 | 6.30 | KR | 0956326 | B1 | 2010.10.01 | Lactobacillus plantarum originated from kimchi and use thereof |
| 5 | 6.30 | KR | 1416149 | B1 | 2014.07.01 | Composition comprising inhibitory activity |
| 6 | 6.30 | KR | 1171863 | B1 | 2012.08.01 | The activity of prpf4, a novel cancer therapeutic target |
| 7 | 6.00 | KR | 1550721 | B1 | 2015.09.01 | Aptamers for mature white adipocytes and Uses thereof |
| 8 | 6.00 | KR | 1091148 | B1 | 2011.12.01 | A composition comprising extracts of hura crepitans L. for prevention of inflammatory diseases |
| 9 | 5.70 | KR | 1316088 | B1 | 2013.10.01 | Composition comprising extract of rhodotypos scandens as active ingradient |
| 10 | 5.40 | KR | 1509706 | B1 | 2015.04.01 | Composition for preventing obesity comprising blueberry fermentation extract |

Figure 12:
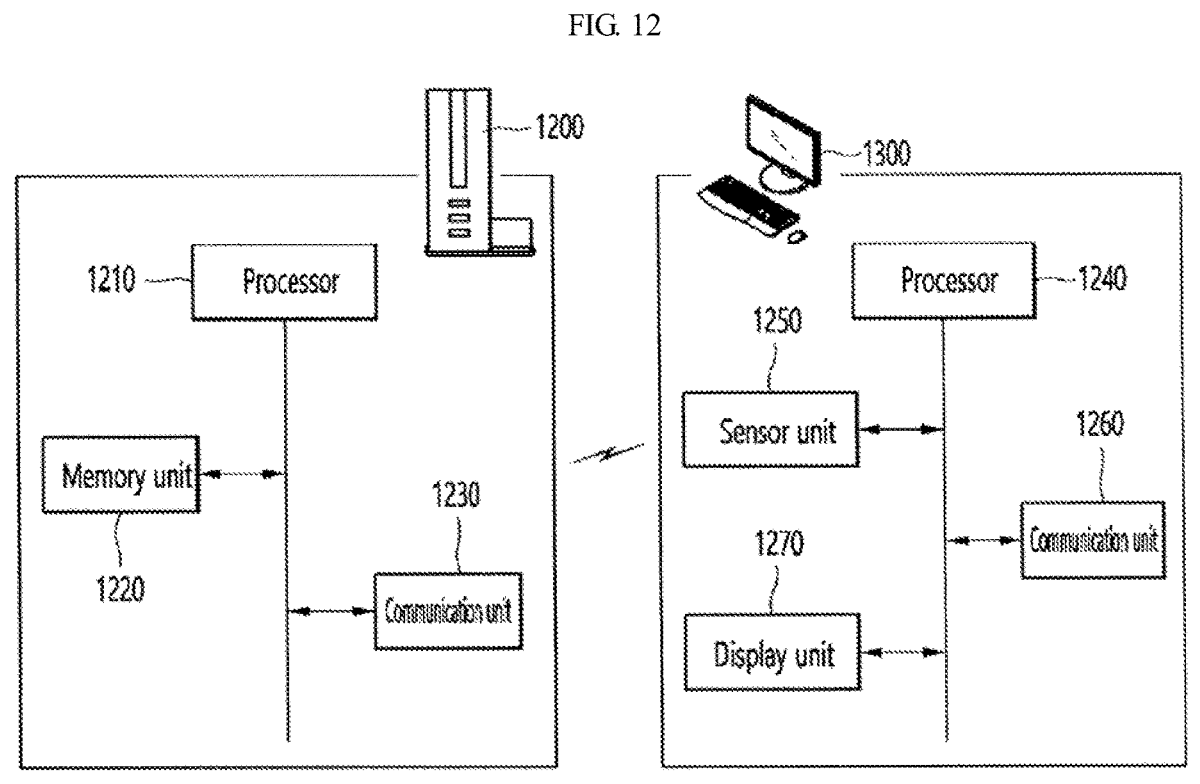

1200
1300
1210
Processor
Processor
1240
1250
Sensor unit
1260
Memory unit
1230
Communication unit
1270
1220
Communication unit
Display unit

FIG. 13

MACHINE LEARNING-BASED USER-CUSTOMIZED AUTOMATIC PATENT DOCUMENT CLASSIFICATION METHOD, DEVICE AND SYSTEM

CROSS-REFERENCE TO RELATED APPLICATIONS

This application is a Rule 53(b) Continuation of U.S. application Ser. No. 17/489,072 filed Sep. 29, 2021, which is a Continuation of International Application No. PCT/KR2020/004341 filed Mar. 30, 2020, which claims priority based on Korean Patent Application No. 10-2019-0037299 filed Mar. 29, 2019 and Korean Patent Application No. 10-2019-0037300 filed Mar. 29, 2019, the respective disclosures of all of the above of which are incorporated herein by reference in their entirety.

TECHNICAL FIELD

The present invention relates to a method and a system/a device for automatically classifying patent documents by learning classification patterns of patent documents of a user to construct a classification model and using the constructed classification model.

BACKGROUND

In recent years, machine learning that is applicable to various fields has been developed. Such machine learning is a field of artificial intelligence, and may be divided into supervised learning, unsupervised learning, and reinforcement learning, and the like depending on its type, and various types of algorithms such as an artificial neural network, boosting, decision tree, support vector machine, and random forests have been developed.

The artificial neural network includes an input layer, a hidden layer, and an output layer, and is divided into a shallow neural network and a deep neural network according to a method of stacking the hidden layer. Further, as more improved artificial neural networks in the deep neural network, a convolutional neural network ('ConvNet'), a recurrent neural network, a deep belief network, a deep Q-network, and the like have been developed, and a machine learning type of these artificial neural networks (including the deep neural network) is generally referred to as deep learning. That is, the deep learning is to learn data by using information I/O layer similar to neurons of the brain and is referred to as machine learning that attempts a high level of abstraction through a combination of various nonlinear conversion methods.

DISCLOSURE

Technical Problem

Recently, as various business/projects based on patents are activated, there are many works that classify patents by technology. In Patent Offices of various countries, technical classification codes (IPC, CPC, etc.) are specified by patent document to perform technical classification. However, these technical classification codes are randomly specified, and are not frequently matched with technologies actually disclosed in the patent documents, and since the matching degrees with actual industries and the products are not only deteriorated, but also do not meet a standard to be classified by a user, the technical classification codes are not frequently used in actual classification work. As a result, since the user needs to perform the classification work by directly identifying all patents to be classified, there is a problem that a lot of time and cost/manpower are consumed.

Furthermore, patent owners (individuals/companies) may differently set the duration by technology according to their own patent strategies. In this case, the patent owners need to directly calculate a duration/expiration average period for each technology of expired patent documents, and need to apply the duration for each technology calculated above after classifying pending patent documents for each technology. When a lot of time and cost/manpower are required, and there are many owning patents, there is a problem that it is very difficult to manage these durations.

Technical Solution

According to an embodiment of the present invention, a method for classifying patent documents may include the steps of learning patent documents stored in a patent database by machine learning technology, establishing a first classification standard based on similarity between the patent documents, and generating a basic classification model of classifying the patent documents based on the first classification standard; generating a patent pool including a plurality of patent documents based on a search and/or selection input of the user; receiving the classification input of the user and classifying the plurality of patent documents included in the patent pool according to the classification input; predicting a second classification standard classifying the plurality of patent documents by the user based on the similarity between the classified patent documents; and classifying remaining patent documents which are not yet classified in the patent pool based on the basic classification model and the second classification standard.

Advantageous Effects

According to an embodiment of the present invention, since a user predicts a desired classification standard by learning the classification standard of the user to automatically classify patent documents, there is an effect of reducing clearly time/efforts/costs/inconvenience taken for the user to classify the patent documents.

Further, according to the embodiment of the present invention, the user learns expiration patterns of held patent rights for each technology to predict the duration for each desired technology and predict the expiration periods for pending patent rights, thereby managing more easily and efficiently the durations of holding patents of the user.

In addition, there are effects according to various embodiments of the present invention, which will be described below in detail with reference to each drawing.

DESCRIPTION OF DRAWINGS

FIG. 1 is a diagram illustrating a patent document search result screen of a patent search engine according to an embodiment of the present invention.

FIG. 11 is a diagram illustrating a patent expiration recommendation list according to an embodiment of the present invention.

FIG. 12 is a diagram illustrating a block diagram of a patent document classification system according to an embodiment of the present invention.

FIG. 13 is a diagram illustrating a block diagram of a patent document classification system according to an embodiment of the present invention.

DETAILED DESCRIPTION

Figure 2:
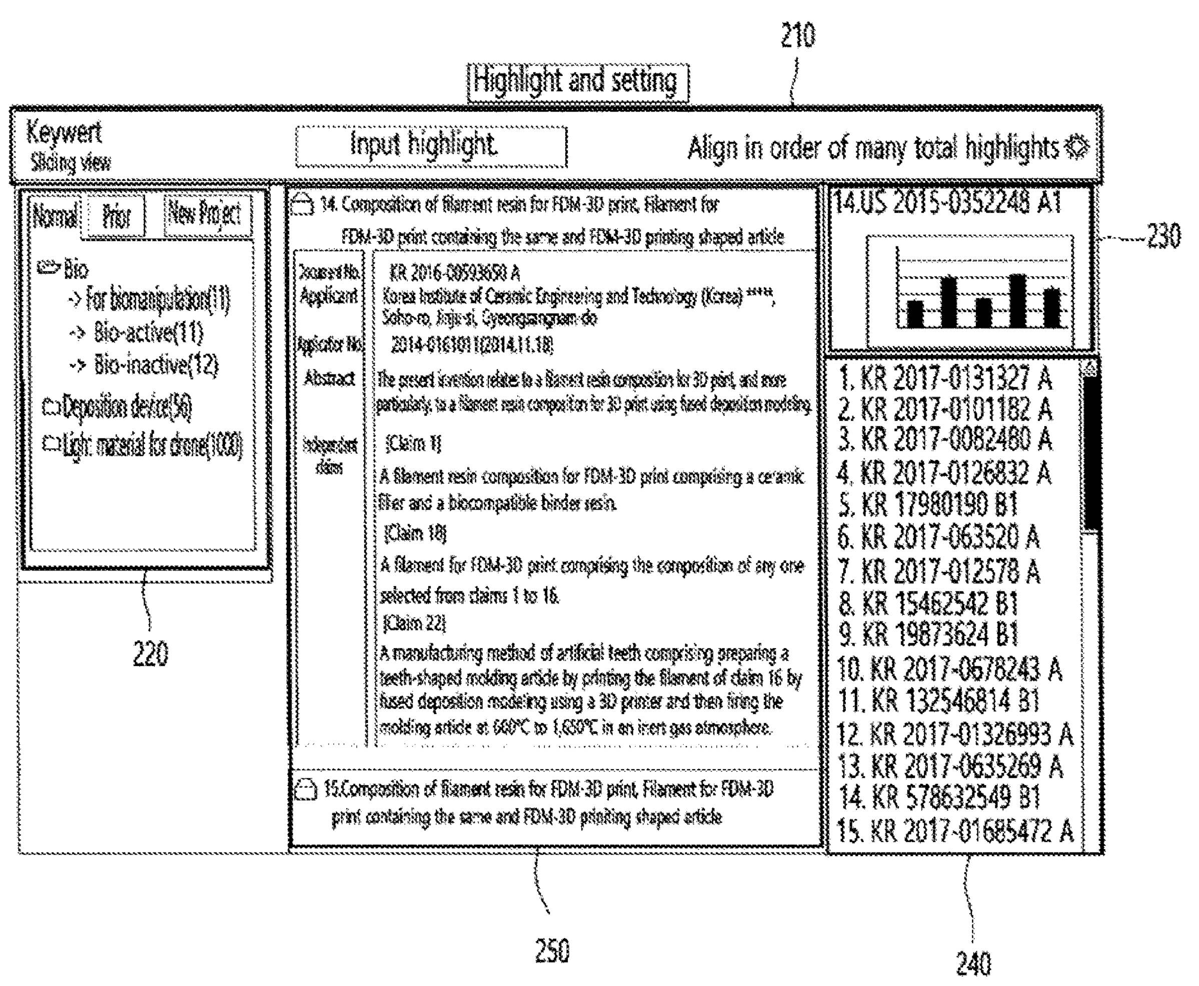
FIG. 2 is a diagram illustrating a sliding view screen according to an embodiment of the present invention.

The present invention to be described below may have various modifications and various embodiments, and specific embodiments will be illustrated in the drawings and described in detail. However, the present invention to be described below is not limited to specific embodiments, and it should be understood that the present invention covers all modifications, equivalents and replacements included within the technical idea and technical scope of the present invention.

Terms such as first, second, A, and B may be used for describing various components, but the components are not limited by the terms and the terms are used only for distinguishing one component from other components. For example, a first component may be referred as a second component, and similarly, the second component may also be referred as a first component, without departing from the scope of the invention to be described below. A term 'and/or' includes a combination of a plurality of associated disclosed items or any item of the plurality of associated disclosed items.

It is to be understood that singular expression encompass plural expressions unless otherwise indicated in the context, and it should be understood that term "including" or the like indicates that a feature, a number, a step, an operation, a component, a part or the combination thereof described herein is present, but does not exclude a possibility of presence or addition of one or more other features, numbers, steps, operations, components, parts or combinations thereof.

Before the detailed description of the drawings, the distinction to components herein is to clarify that each component is only distinguished for each main function of each component. That is, two or more components to be described below may be combined into one component or one component may be divided into two or more components for each subdivided function. In addition, each of the components to be described below may additionally perform some or all of the functions that are handled by other components in addition to main functions that the corresponding component is responsible for, and some of the main functions of which the respective components are charged may be exclusively carried out by other components.

Further, in performing methods or operating methods, respective processes of configuring the method may be performed differently from a specified order unless otherwise disclose a specific order in the context. That is, the respective processes may be performed similarly to the specified order, performed substantially simultaneously, and performed in an opposite order.

The present invention is based on a website/server (or a computer program/application in which a patent search function is implemented by the website/server) providing a patent search engine. Thus, the embodiments described herein may be performed by a web server, an application server, and/or a client device, and a system including them may be collectively referred to as a 'patent document classification system.' Hereinafter, for convenience of description, a subject performing the embodiment has been described with the 'patent search engine' or the 'patent document classification system,' but may be described to be replaced with a web server, an application server, and/or a client device. Further, for convenience of description, the present invention has been described based on a patent search engine provided through a website, but is not limited thereto, and may be applied even to a patent search engine provided through an application.

First, a basic function and a graphic user interface (GUI) of the patent search engine of the present invention will be described and then a method for automatically classifying patent documents will be described in detail.

Figure 1:
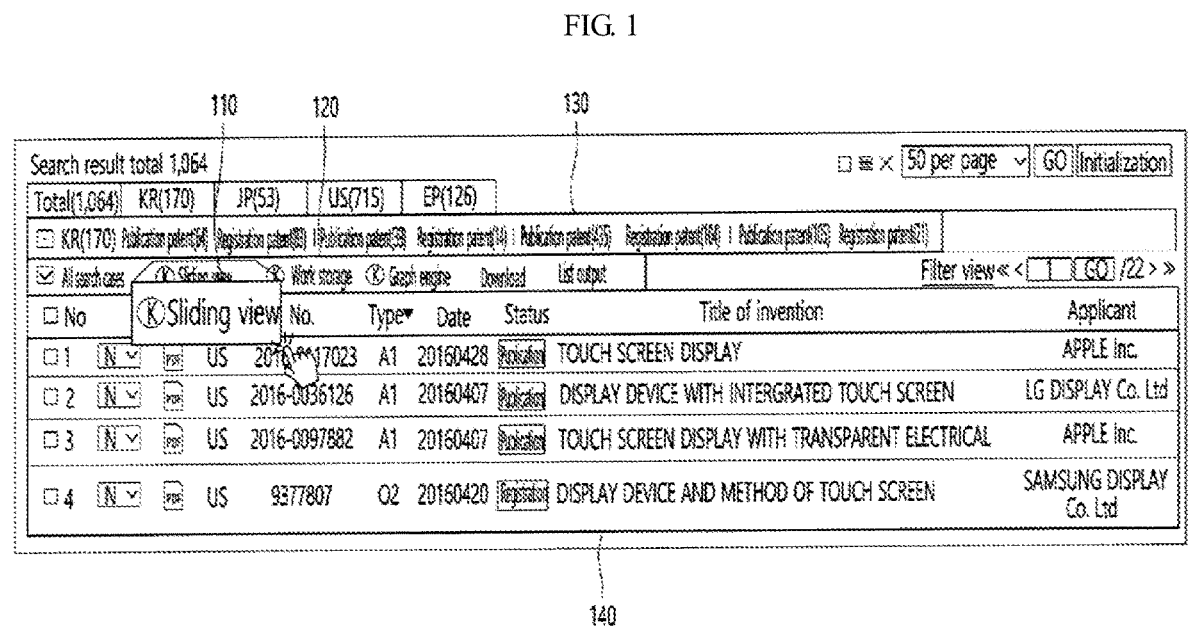

FIG. 1 is a diagram illustrating a patent document search result screen in a patent search engine according to an embodiment of the present invention.

A patent search engine of the present invention may provide various information on patents searched according to a search input of a user on one screen.

For example, as illustrated in FIG. 1, the patent search engine may provide a patent document number 130 searched by country/status, a patent document list 140 searched entirely or by country, and the like, as a patent document search result. Particularly, the patent search engine may also provide bibliographic information (application country, application/registration No., type, application date, current status (application/publication/registration, etc.), title of invention, etc.) on each patent document when the patent document list 140 is provided.

Further, the patent search engine may provide an execution button tab 120 for the searched patent documents to allow a user to instruct various additional works. For example, as illustrated in FIG. 1, the patent search engine may provide a sliding view 110, and the execution button tab 120 including execution buttons for work storage, graph engine, download, and list output works.

Here, the sliding view 110 provides a list-up function by summarizing information (e.g., representative drawing, abstract information, independent claims, etc.) representing each patent document on one screen so that the user may more easily determine the searched patent documents and enables the user to more easily determine patent documents through the corresponding function. This will be described below in detail with reference to FIG. 2.

The work storage provides a function of storing patent documents in a specific folder, and may be used in a patent document classification work proposed herein. The graph engine provides a function of collecting the patent documents selected by the user to generate graphs or calculate statistics according to desired criteria of the user. The download provides a function of downloading the patent documents, and the list output provides a function of outputting lists, summary information, and the like of the searched patent documents.

In addition, the patent search engine may provide an execution button to instruct various additional works using the patent documents, and is not limited to the above-described embodiment.

FIG. 2 is a diagram illustrating a sliding view screen according to an embodiment of the present invention.

Referring to FIG. 2, the sliding view screen may be largely configured by a highlight window 210, a project window 220, a representative drawing window 230, a patent document representative content window 250, and a patent list window 240.

The highlight window 210 provides a function of emphasizing and displaying specific keywords/search words input by the user in each patent document. The project window 220 is a project window that allows the user to manage (generate, edit, etc.) various upper/lower folders generated by the user. The user may classify the patent documents by storing the patent documents in a desired folder, and manage the patent documents for each folder.

The representative drawing window 230 provides a function of showing a representative drawing of a target patent document, and the patent document representative content window 250 performs a function of providing a summary of representative information required to identify the target patent document. The user may easily grasp the characteristics and technical contents of the target patent document through the representative drawing window 230 and the patent document representative content window 250 at a time.

The patent list window 240 is a window that provides a list of patent documents that the user has selected to see the sliding view. Through the patent list window 230, the user may determine how many patent documents are included in a current pool, and determine which patent document the user currently sees.

As a result, the patent search engine based on the present invention will be briefly described. Embodiments of the present invention to be described below may be performed/provided based on such a patent search engine, and particularly, the patent classification system and method may be provided as one function within the sliding view screen. However, the present invention is not limited to the patent search engine, and may be applied to various patent search engines/sites equally/similarly.

Figure 3:
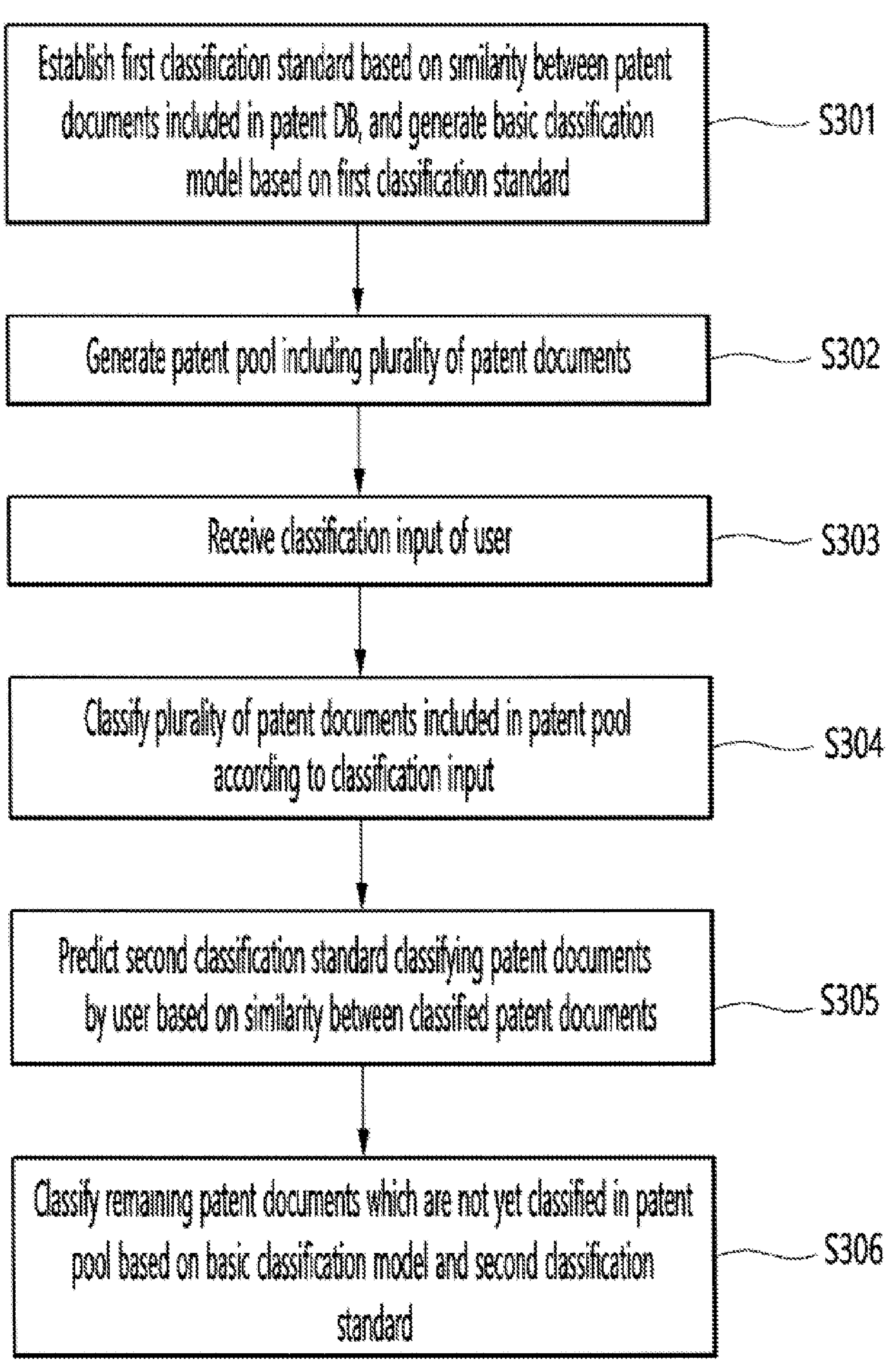
FIG. 3 is a flowchart illustrating a method for classifying patent documents in a patent document classification system according to an embodiment of the present invention.

FIG. 3 is a flowchart illustrating a method for classifying patent documents in a patent document classification system according to an embodiment of the present invention.

Referring to FIG. 3, first, the patent document classification system may learn some or all patent documents stored in a patent database by a machine learning technology. Furthermore, the patent document classification system may establish a first classification standard based on the similarity between the patent documents learned based on the machine learning technology and generate a basic classification model that classifies the patent documents according to the established first classification standard (S301).

The patent document classification system may learn patent documents using various machine learning technologies. As an embodiment of the machine learning technology, recurrent neural networks (RNNs), deep neural networks (DNNs), and/or convolutional neural networks (CNNs), etc. may be used. The RNNs technology may be an artificial neural network which recognizes patterns from data having a constant array (sequence or series data) such as writing, genes, handwriting, voice signals, data sensed by a sensor, texts, stocks, and the like. In the RNNs technology, data input currently and data input in the past are considered at the same time, and information of the array is stored in the hidden layer of the RNNs, and the information stored in the hidden layer may be used again when the stored information receives a required input after a predetermined time. The DNNs refer to a learning method that has two or more hidden layers. In the DNNs, a computer may derive an optimal partition line by repeating a process of self-making a classification label, distorting a space, and partitioning data by itself. The CNNs technology is an algorithm of applying the DNNs and will be described below in step S306 in more detail.

The patent document classification system may translate the patent documents into one common language (e.g., Korean or English) using a translation engine before learning the patent documents and learn the patent documents with one unified language. However, it is not limited thereto, and the patent document classification system may also translate the patent documents into at most two languages using the translation engine to learn the patent documents.

The patent document classification system may determine similarity between the patent documents based on family patent documents, patent classification codes (e.g., IPC, CPC, etc.), prior patent documents, patent documents cited in an examination step, citing patent documents in an examination step of other patent documents, keywords and/or text data (extracted by text mining), etc. of the respective patent documents. At this time, the text data may be vectored by using an algorithm such as Word Embedding, and Word2vec.

The patent document classification system may use a Cosine coefficient, a Jaccard coefficient, a Dice coefficient, a Euclidean distance, a vector inner product, etc. for calculating the similarity between the patent documents. According to the embodiment, it may be necessary to use a method of measuring specific similarity according to a classification (or clustering) technique, and for example, there are a ward method of measuring a distance between documents using the Euclidean distance, a group average method of calculating similarity by an inner product, etc., and patent documents (or members) belonging to each classification (or cluster) may vary according to a similarity measurement method.

Next, the patent document classification system may generate a patent pool including a plurality of patent documents based on search and/or selection input of the user (S302). The plurality of patent documents included in the patent pool may be a target classification document of the user to be described below.

Next, the patent document classification system may receive a classification input of the user (S303), and classify the plurality of patent documents included in the patent pool according to the classification input (S304). The patent document classification system may generate at least one folder according to a folder generation input of the user and perform the classification work by storing (or moving to the folder) the patent documents in the patent pool in each folder according to the classification input of the user. The classification input may include various embodiments as various user inputs for classifying the patent documents, and as an embodiment, the user may perform the classification work simply by performing a motion/touch input of dragging and dropping the patent documents to the folder. As another embodiment, the classification input may correspond to a user input on a quick storage button provided by the patent document classification system. Here, the quick storage button may correspond to a UI provided by the patent document classification system to immediately store and classify the patent documents in a folder desired by the user. The quick storage button may be provided for each patent document. As yet another embodiment, the classification input may correspond to an input for classifying a target patent document by a toggling method, and for example, may correspond to a user input for O or X. The user may classify two classifications (e.g., O or X) by selecting/inputting O or X for the target patent document. The classification item (O or X) may be directly set by the user or provided as a predetermined item from a web/application server. The embodiments of the classification input will be described below in more detail with reference to FIGS. 4 and 7.

Next, the patent document classification system may predict a second classification standard of classifying the patent documents by the user based on the similarity between the classified patent documents (S305). The prediction method of the second classification standard based on the similarity may be performed in the same manner as/similarly to the method of establishing the first classification standard.

Next, the patent document classification system may classify remaining patent documents which are not yet classified in the patent pool based on the basic classification model and the second classification standard (S306).

More specifically, as an embodiment, the patent document classification system may construct a user-customized classification model by combining the predicted second classification standard with the basic classification model. The user-customized classification model may be constructed based on transfer learning. The transfer learning may mainly use a pre-trained model, which means a model that has already been learned with large-sized data while having similar task resolution purposes. In particular, in the present disclosure, the pre-trained models used for transfer learning may have a convolutional neural networks (CNNs) structure. The CNN consists of two parts:

Convolutional base: Part in which convolutional layers and pooling layers are stacked in multiple layers. The goal of the convolutional base is a feature extraction of effectively extracting features from the data.

Classifier: Mainly consisting of a fully connected layer. The fully connected layer means a layer in which neurons of all layers are all connected to an output node of a previous layer wholly. The final goal of the classifier is to learn the extracted features well and classify data to an appropriate category (image classification).

The patent document classification system may construct a user-customized classification model using these two parts, and particularly, the convolutional base may be fixed, but may construct the user-customized classification model using a strategy of learning newly only a classifier. The strategy may be applied advantageously when a computing ability is lacking or the data set is too small, and/or when a problem to be solved is very similar to a data set that the pre-trained model is already learned.

When this is applied to the embodiment, the patent document classification system may construct the user-customized classification model by fixing the basic classification model as the convolutional base and then newly learning the second classification standard as a classifier. Here, the fixing of the basic classification model may be interpreted to fix a feature/standard for pre-classifying the patent documents of the patent pool by the number of folders generated by the user based on the first classification standard of the basic classification model. Accordingly, the pre-classified feature/standard is fixed according to the first classification standard, and the user-customized classification model may be constructed by learning newly the classification feature/standard as a classifier according to the second classification standard.

As another example, the patent document classification system may also classify the patent documents using only the basic model without learning the patent documents classified by the user like the embodiment. In this case, the patent document classification system may calculate a technical distance between the patent documents classified by the user based on the basic classification model and predict the second classification standard based on the calculated technical distance (that is, without learning). The patent document classification system may classify the remaining patent documents based on the second classification standard predicted based on the basic classification model. For example, when some patent documents in the patent pool are classified into four classifications by the user, the patent document classification system may extract features of a patent group included in the four classifications based on the basic classification model and automatically classify the remaining patent documents according to a feature for each patent group in the extracted basic classification model. According to the embodiment, the second classification standard may be interpreted in the form of reducing the entire classification types/number by grouping the classification of the first classification standard according to a user classification feature. For example, when the number of technical classifications which may be classified according to the first classification standard is 1000, the second classification standard may be established to divide 50 technical classifications by clustering/grouping 1000 technical classifications with high similarity according to a classification pattern/standard of the user.

Furthermore, the patent document classification system may output an input button (e.g., classification start button) for instructing automatic classification for the remaining patent documents. When the user's input for the input button is received, the patent document classification system may classify the remaining patent documents using the user-customized classification model. More specifically, the patent document classification system may classify the remaining patent documents using the user-customized classification model when receiving the user's input for the input button to automatically store the classified patent documents in each folder suitable for the classification feature.

That is, the flowchart may be applied like the following embodiment.

The user may search for 1000 patents and set the searched patents in a patent pool and generate four folders. The patent document classification system may pre-classify the 1000 patents to the four folders using the basic classification model. The user may first classify and store 100 patents of the 1000 patents to the four folders and the patent document classification system may predict a classification standard/feature of the user from the classification information of the user. The patent document classification system generates a model of adding the classification standard/feature of the user to the pre-classified standard/feature (that is, the first classification standard) to classify and store the remaining 900 patents in the four folders.

Meanwhile, although not illustrated in the flowchart, the patent document classification system may calculate accuracy (first accuracy) of the automatic classification in real time and output an indicator of indicating the first accuracy in real time.

As an embodiment, the first accuracy may be calculated based on the number of patent documents included in the patent pool, the number of classifications set/defined by the user, and/or the number of patent documents classified by the user up to now. More specifically, the patent document classification system may learn the basic classification model to calculate/derive second accuracy as data in advance according to the total number of patent documents to be classified (first factor), the number of classifications (second factor), and/or the number of patent documents included for each classification (third factor). For example, the patent document classification system may calculate/derive in advance statistical data that when the number of patent documents to be classified is 1000, the number of classifications is 3, and the number of patent documents included for each classification is 100, the classification accuracy is 80% as a result of learning the basic classification model. In this case, the patent document classification system may derive the first accuracy by substituting the classification pattern/standard of the user to the statistical data as a factor. That is, the first accuracy may correspond to the second accuracy calculated in advance when the user sequentially applies the number of a plurality of patent documents included in the patent pool, the number of classifications according to the second classification standard, and/or the number of patent documents included for each classification to the statistical data as first to third factors. Accordingly, if the user includes 1000 patent documents in the patent pool and classifies 100 patent documents in three folders, respectively, according to the above example, the classification accuracy (that is, first accuracy) of the user is derived to 80%. As a result, additionally, the patent document classification system may derive/display the first accuracy by additionally considering a probability (indirect verification whether the user has been classified well) according to how close to a distance between the patent documents included for each classification by the user.

Based on the aforementioned contents, the first to third factors for deriving the maximum accuracy may be fixed in the statistical data derived based on the basic classification model. In this case, the patent document classification system may output an alert pop-up window for guiding the additional classification to the user when it is determined that the derived first accuracy is lower than the maximum accuracy. For example, when the patent documents are classified to three classifications in the patent pool including 1000 patent documents to be classified, in order to derive 80% of the maximum accuracy, the number of patent documents to be at least classified for each folder may be defined to 100. Accordingly, the patent document classification system may output an alert pop-up window for guiding this so that the user includes at least 100 patent documents for each folder to reach 80% of the maximum accuracy. For example, the patent document classification system may output an alert pop-up window such as 'since current classification accuracy is 60%, classify more patents,' or 'since the accuracy of the classification of an XX folder is low, classify more patents in the XX folder,' or the like.

As another embodiment, the first accuracy may correspond to a matching degree between the result classified by the first classification standard and the result classified by the second classification standard.

The patent document classification system may calculate the accuracy of the automatic classification for each folder and/or patent pool, and output the indicator displaying the accuracy for each folder and/or patent pool.

Figure 4:
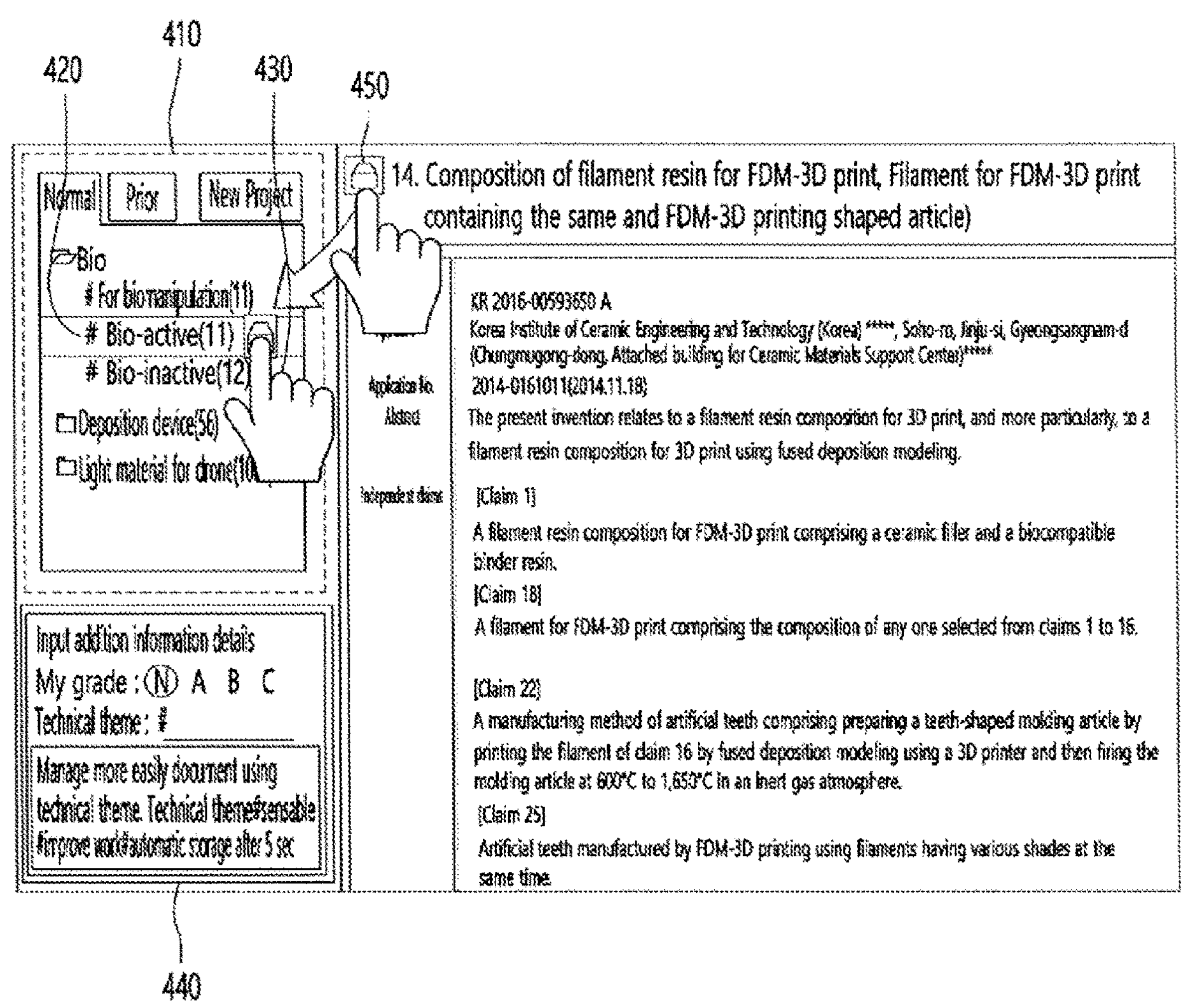
FIG. 4 is a diagram illustrating a method for classifying patent documents according to a classification input of a user according to an embodiment of the present invention.

FIG. 4 is a diagram illustrating a method for classifying patent documents by a classification input of a user according to an embodiment of the present invention.

As described above, the user may perform simply a classification work by dragging and dropping the patent documents to a folder to be classified.

Based on the sliding view screen configuration, for example, as illustrated in FIG. 4, the patent document classification system may output an icon 450 capable of dragging and dropping the corresponding patent document to the folder on the patent document representative content window. A folder 420 generated by the user for classification may be provided in a project window 410 of the sliding view and the user may perform classification and storage works to the corresponding folder 410 by an input of dragging and dropping (430) the icon 450 to the desired folder 410.

Furthermore, the patent document classification system may provide a setting UI 440 so that the user may directly set a grade and/or technical theme/keyword for each folder 410, which will be described below with reference to FIGS. 5 and 6.

Figure 5:
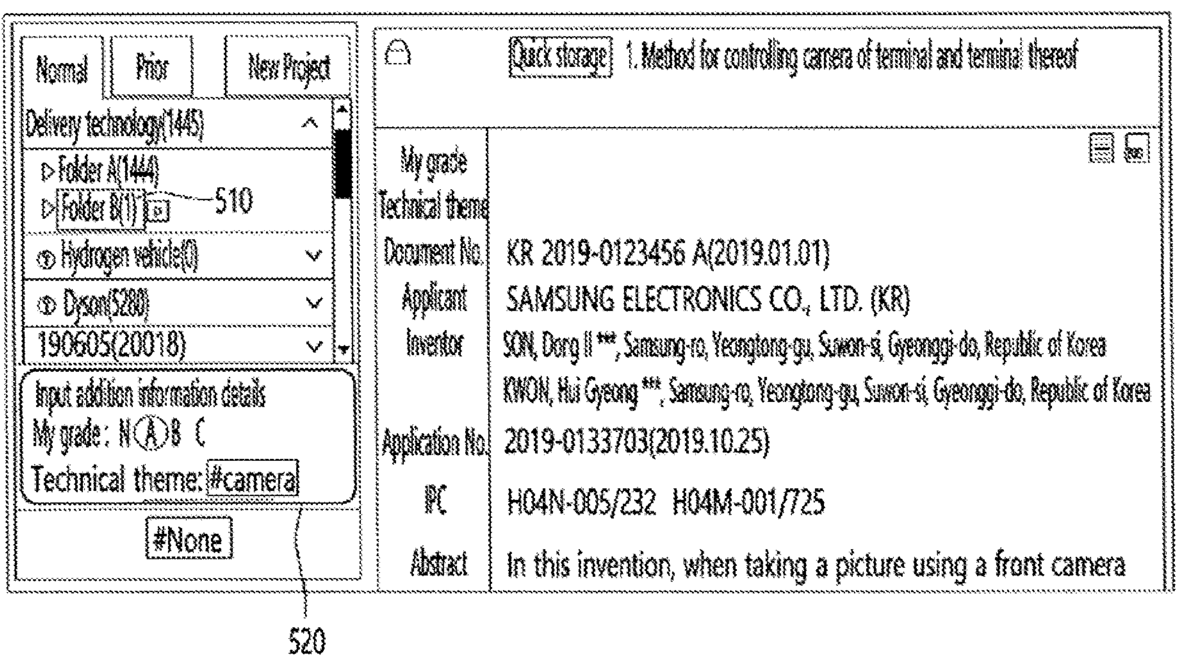
FIG. 5 is a diagram illustrating a folder setting UI diagram according to an embodiment of the present invention.
Figure 6:
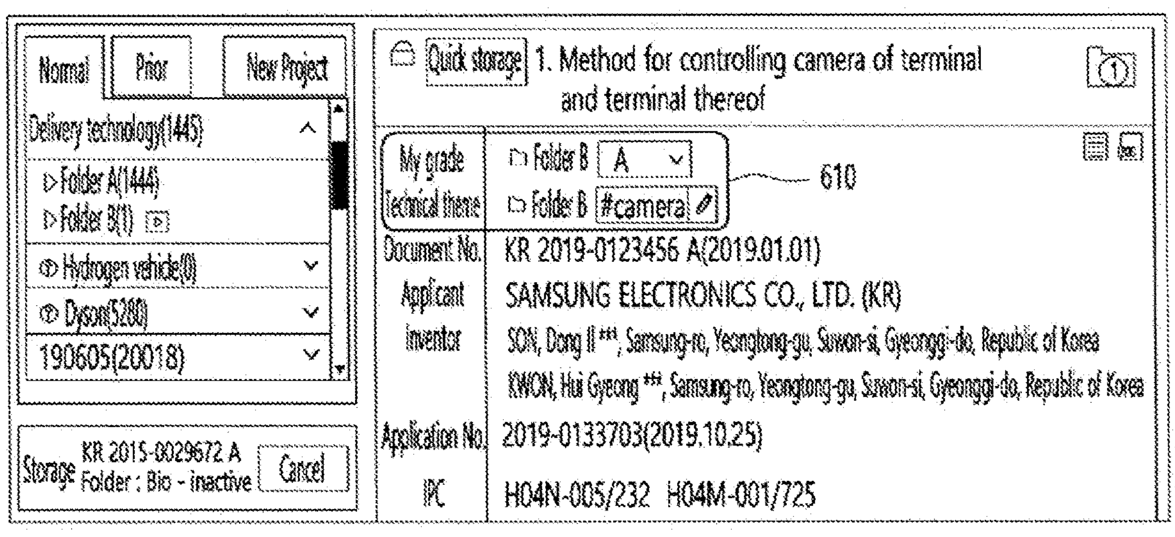
FIG. 6 is a diagram illustrating a method for displaying representative information of a patent document by folder setting according to an embodiment of the present invention.

FIG. 5 is a diagram illustrating a folder setting UI according to an embodiment of the present invention and FIG. 6 is a diagram illustrating a method for displaying representative information of patent documents by folder setting according to an embodiment of the present invention.

The patent document classification system may provide a setting UI 520 so as to allow the user to input directly additional information for each folder. For example, as illustrated in FIG. 5, the patent document classification system may output the setting UI 520 capable of setting a grade and/or keyword/theme for each folder 510. The user may select the folder 510 to be set and then directly set an important grade and/or keyword/theme for the selected folder 510 to more easily manage the patent documents for each folder 510.

The patent documents included/stored in the folder in which the additional information is input/set using the setting UI 520 may be provided to the user since the set/input additional information is representative information.

For example, as illustrated in FIGS. 5 and 6, when a grade is set to A and a keyword/theme is set to #camera in a folder B, the grades of the patent documents stored in the folder B all are set to A and the keywords/themes all are set to #camera to be displayed as representative information 610. Accordingly, since the user may set a grade/keyword/theme, etc. for each patent document in a folder unit using the setting UI 520 of the folder without setting individually, the user may more easily manage the patent documents for each folder.

Figure 7:
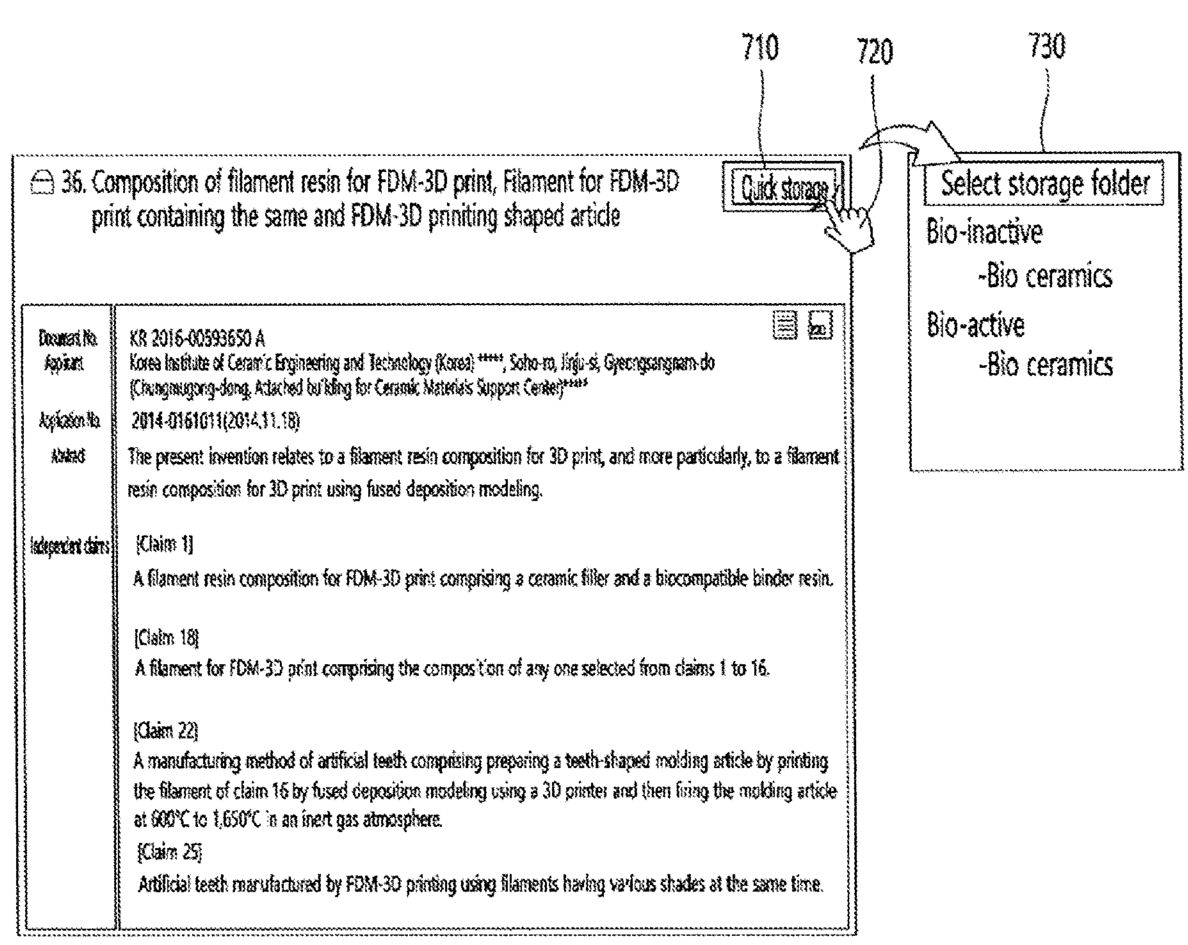
FIG. 7 is a diagram illustrating a method for classifying patent documents by a classification input of a user according to an embodiment of the present invention.

FIG. 7 is a diagram illustrating a method for classifying patent documents by a classification input of a user according to an embodiment of the present invention.

As described above, the user may perform simply a classification work by performing a user input for a quick storage button 710 output with the patent documents.

Based on a sliding view screen configuration, for example, as illustrated in FIG. 7, the patent document classification system may output the quick storage button 710 capable of immediately storing the corresponding patent document in the folder on the patent document representative content window. The user may immediately store the corresponding patent document in the folder by touching/selecting (720) the quick storage button. When there is a plurality of storable folders, the patent document classification system may provide a selection UI 730 capable of selecting the storable folder when receiving the user input for the quick storage button. The user may select and input a folder to store a target patent document from folders displayed in the selection UI 730 to immediately store the target patent document in the corresponding folder.

Figure 8:
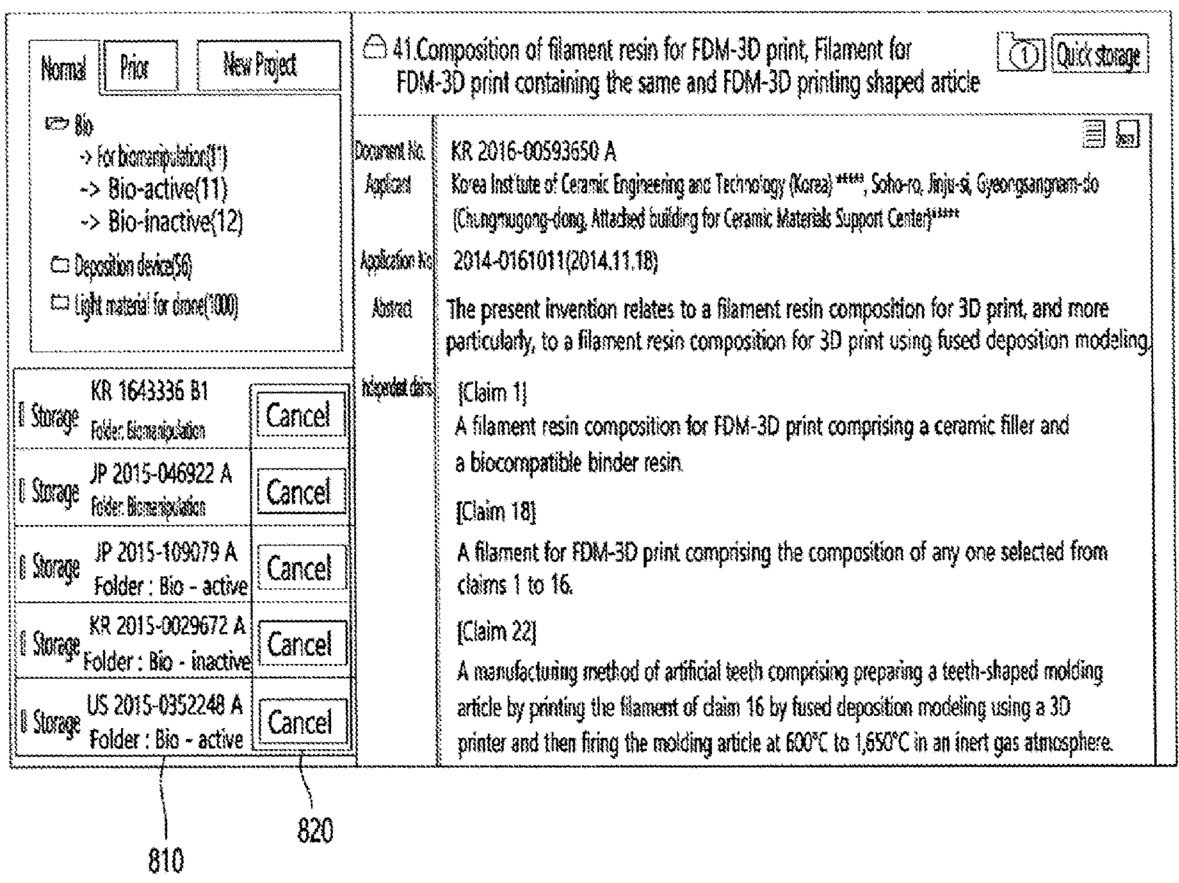
FIG. 8 is a diagram illustrating a classification history window according to an embodiment of the present invention.

FIG. 8 is a diagram illustrating a classification history window according to an embodiment of the present invention.

Referring to FIG. 8, the patent document classification system may record a last classification history of the user and provide a window 810 (that is, a classification history window) on which the corresponding record information is displayed to the user.

In the classification history window 810, the patent documents lately classified by the user may be listed-up in order to be classified and simple classification information (e.g., application/registration number of the classified patent document, stored folder, etc.) on each patent document may be provided together. Furthermore, the classification history window 810 may provide a 'cancel' icon 820 for each classified patent document together. The 'cancel' icon 820 corresponds to an icon for canceling the classification work of the target patent document. Accordingly, when the user input for the 'cancel' icon 820 is received, the patent document classification system may cancel the execution of the classification work for the target patent document in which the cancellation input is received and the target patent document returns to a state before stored/included in the corresponding folder (that is, before classification).

Figure 9:
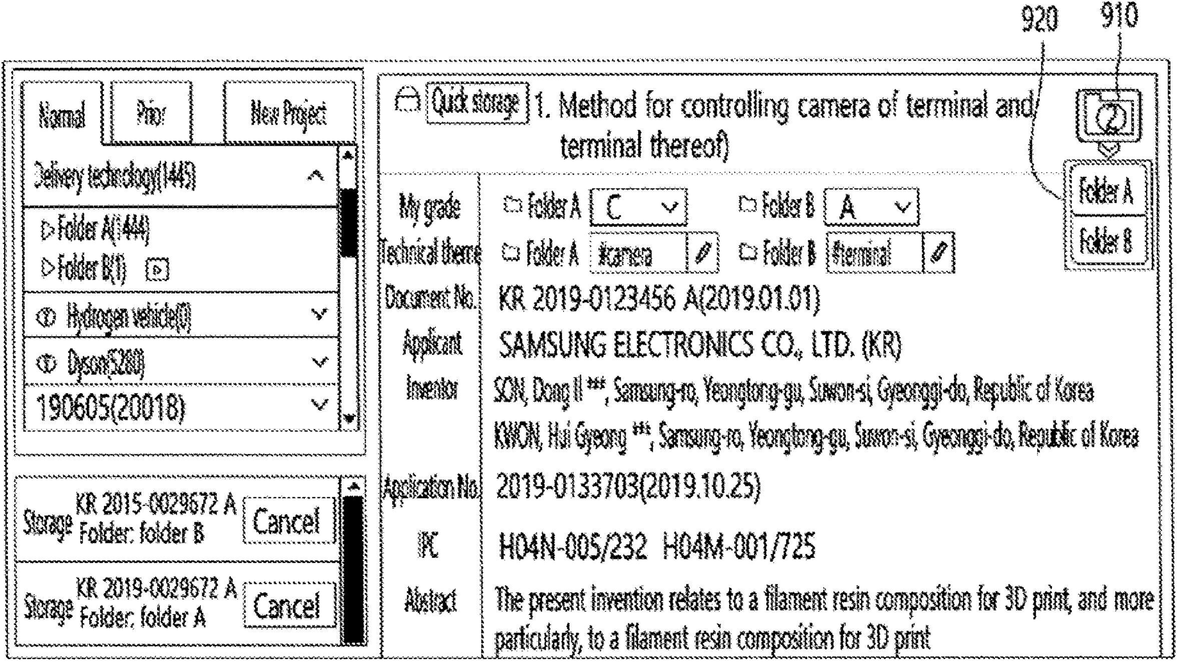
FIG. 9 is a diagram illustrating a multi-folder storage method according to an embodiment of the present invention.

FIG. 9 is a diagram illustrating a multi-folder storage method according to an embodiment of the present invention.

The patent document classification system supports a multi-folder storage method, and as a result, one patent document may be stored in a plurality of folders at the same time. For example, the target patent document may be stored in folders A and B at the same time.

The patent document classification system may provide an icon 910 for displaying information about the folder where the target patent document is stored/classified. For example, as illustrated in FIG. 9, when the target patent document is stored/classified in the folders A and B, the patent document classification system may provide a folder icon 910 that indicates the number 2 of folders and may provide list information 920 (folders A and B) of folders where a current target patent document is stored when the user touches/selects the folder icon 910.

As the patent document classification system supports the multi-folder storage method, in each patent document, grades and/or keywords/themes may be allocated by the total number of folders which have been at most currently generated (grade and/or keyword/theme may be set for each folder).

Although not illustrated in the drawing, the patent document classification system in which the automatic classification is completed may provide a reclassification UI for each folder so that the user may directly check and correct the classification content.

The reclassification UI may provide a reclassification target display button for reclassifying the patent documents classified to each folder by the user, a reclassification button for instructing reclassification for the reclassified target patent document, etc. Accordingly, the user may display a target patent document in which the classification to the corresponding folder is not appropriate using the 'reclassification target display button' and may use the 'reclassification button' for deleting the patent document displayed by the reclassification target display button from the corresponding folder or transferring the patent document to another folder. The reclassification target may be displayed as various embodiments, and for example, may be displayed using a tag or color provided from a web/application server (alternatively, directly set by the user). In this case, the user may select and input (for example, touch/click input) the tag or color provided by the web/application server for each patent document to specify a patent document requiring reclassification.

The patent document classification system may evolve itself by dating the content reclassified by the user as such and learning the reclassified data based on the basic classification model.

As described above, a method of constructing a user-customized classification model based on machine learning (or deep learning) and automatically classifying patent documents using the same will be described. A method of constructing a new model by combining a user classification pattern/habit on the existing model as a new feature/standard may be applied to various user-customized patent management embodiments. For example, it is possible to predict/recommend an expiration period of patent rights, the number of claims to be held for each patent, a right assignment possibility (license), a patent holding method for each inventor, a patent holding method according to patent evaluation, etc. by using the method.

For example, when the method of the present invention is applied to prediction of the expiration period of patent rights, the patent document classification system may classify holding patents of the user by technology (at this time, usable a basic classification model), and learn a patent expiration pattern by classified technical field to generate a user-customized model. Through this, the patent document classification system may automatically recommend a patent expiration prediction period by technical field in a desired cycle of the user according to an existing patent management (expiration, etc.) pattern/feature of the user.

For example, when in the Korea Research Institute of Bioscience and Biotechnology, stem cell-related patents have a feature of maintaining more than 15 years without expiration, while compound or manufacturing process patents have features/patterns of collective expiration within 5 years, the patent document classification system determines the expiration features/patterns to recommend the stem cell-related patents currently holding in the Korea Research Institute of Bioscience and Biotechnology to be held for 15 years or more and guide/recommend the compound or manufacturing process patents to expire within 5 years.

The embodiment will be described below in more detail with reference to FIG. 10.

Figure 10:
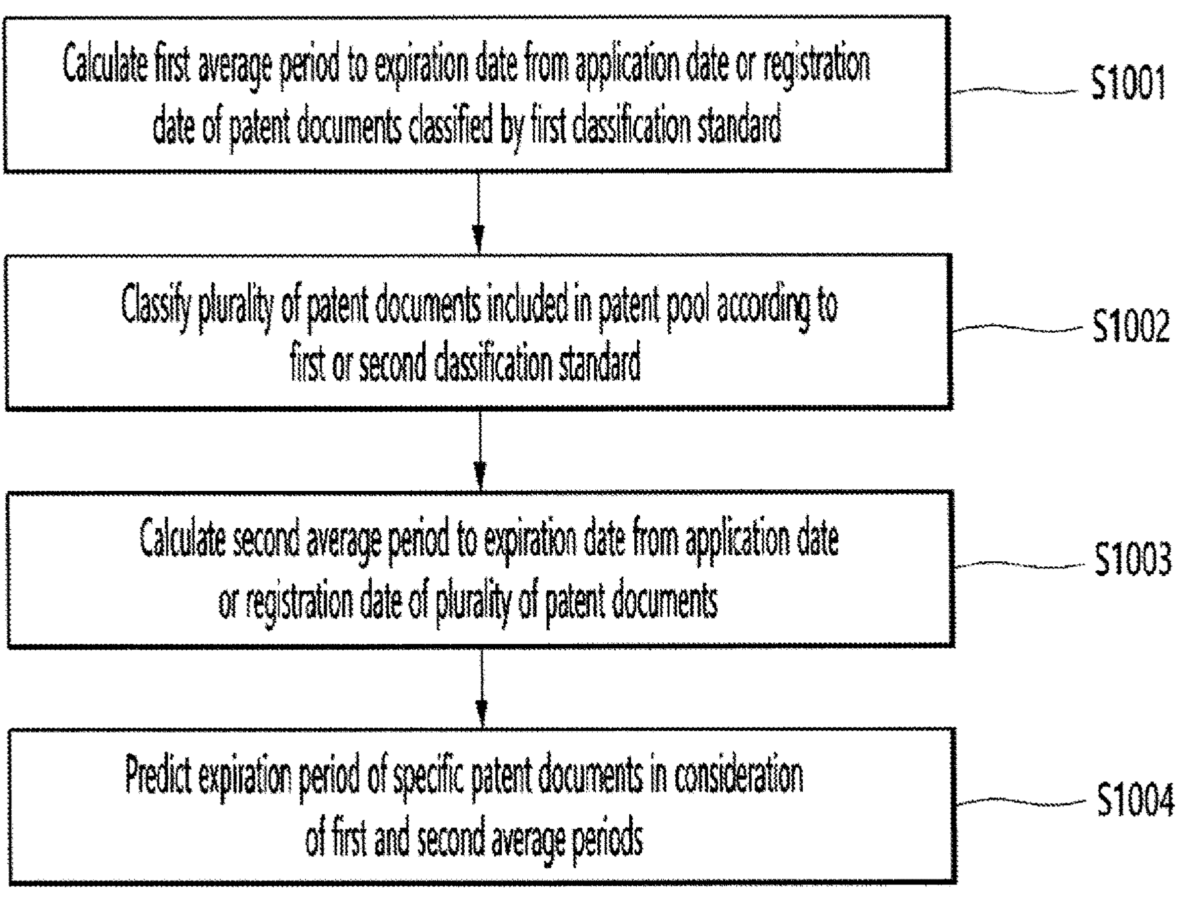
FIG. 10 is a flowchart illustrating an embodiment of predicting expiration periods of patent documents according to an embodiment of the present invention.

FIG. 10 is a flowchart illustrating an embodiment of predicting expiration periods of patent documents according to an embodiment of the present invention.

This embodiment was written as an embodiment followed to the embodiment of FIG. 3 for convenience of explanation, but is not limited thereto, and may be performed as an embodiment independent of FIG. 3.

First, the patent document classification system may calculate a first average period to an expiration date from an application date or registration date of the patent documents classified by the first classification standard by classification using the basic classification model with respect to the patent documents included in a patent database (DB) (S1001).

Next, the patent document classification system may classify a plurality of patent documents included in the patent pool according to the first or second classification standard (S1002), and calculate a second average period to an expiration date from an application date or registration date of the plurality of patent documents by classification (S1003). Here, the plurality of patent documents included in the patent pool may correspond to (include) patent documents which are currently holding or have been held, but currently expired by the user. Through this step, the patent document classification system may predict average patent expiration period/pattern/feature by technology of the user.

Finally, the patent document classification system may predict the expiration periods of the specific patent documents in consideration of the first and second average periods (S1004). Here, the specific patent documents may correspond to (include) patents which are currently holding, but not expired by the user and/or patent documents specified in accordance with the user's input.

The patent document classification system may first classify specific patent documents according to the first and/or second classification standard for predicting the expiration period. Next, the patent document classification system may calculate the expiration periods of the specific patent documents by combining the first and/or second average periods at a predetermined ratio according to classification according to the first and/or second classification standard of the specific patent documents. For example, it is assumed that a first specific patent document belongs to a 'bio' classification according to the first classification standard and an average duration of the 'bio' classification is 5 years in the entire patent DB. Furthermore, it is assumed that the first specific patent document belongs to a 'biorhythm' classification according to the second classification standard and an average duration of the 'biorhythm' classification is 10 years in the user expiration patents. If a predetermined ratio between the first and second classification standards is set to 3:7, a period of $5\times0.3+10\times0.7=8.5$ may be derived as an evaluation index. That is, an expected duration of the first specific patent document may be predicted as 8 years and 6 months.

The predetermined ratio may be set/changed freely according to various embodiments, and in terms of a user-customized model, the ratio of the second classification standard may be set higher than that of the first classification standard.

FIG. 11 is a diagram illustrating a patent expiration recommendation list according to an embodiment of the present invention.

Referring to FIG. 11, the patent document classification system may list-up an expiration period for each specific patent document to the evaluation index 1120 to include and output the expiration period in the patent expiration recommended list 1110.

A time when the patent expiration recommended list 1110 is output may be set to a time before a predetermined time (e.g., before 6 months or a year) from the expiration prediction time, and may be set freely by the user.

The user may predict the expiration periods of the patent rights currently held through the patent expiration recommended list 1110, and efficiently manage the duration of each patent right by determining in advance whether the right is held or expired.

FIG. 12 is a diagram illustrating a block diagram of a system for classifying patent documents according to an embodiment of the present invention.

Referring to FIG. 12, the patent document classification system may largely consist of a web server (or an application server) and a client device.

The web server (or application server) 1200 may include a processor 1210, a memory unit 1220, and/or a communication unit 1230, and the client device 1300 may include a processor 1240, a sensor unit 1250, a communication unit 1260 and/or a display unit 1270. At least one of the components may be excluded or a new component may be included according to an embodiment. In addition, each unit may be provided with a hardware circuit/device or the like to perform functions to be described below, and may be implemented as a chip or a plurality of chips.

The memory unit 1220 may store various digital data, such as videos, audios, photographs, moving images, computer programs, and applications. The memory unit 1220 may correspond to various digital data storage spaces such as a flash memory, a hard disk drive (HDD), and a solid state drive (SSD). Particularly, the memory unit 1220 of the web server (or application server) 1200 may correspond to a patent database, and various patent documents around the world may be stored.

Communication units 1230 and 1260 may perform communication and transmit/receive various data using at least one communication protocol. In particular, a user input to the client device 1300 may be transmitted to the web server (or application server) 1200 through the communication units 1230 and 1260, and may also transmit various output/feedback data/information of the web server (or application server) 1200 to the client device 1300 through the communication unit 1260.

The sensor unit 1250 collectively refers to the various sensing means described above, and may sense various inputs of the user and/or an environment of client device 1300. In particular, the sensor unit 1250 may sense various inputs (e.g., touch/motion/select/search inputs, etc.) of the user, and transmit sensing results to the processor. In one embodiment, the sensor unit 1250 may include at least one of various sensing means such as a gravity sensor, a geomagnetic sensor, a motion sensor, a gyro sensor, an acceleration sensor, an infrared sensor, an inclination sensor, a brightness sensor, an altitude sensor, a smell sensor, a temperature sensor, a depth sensor, a pressure sensor, a banding sensor, an audio sensor, a video sensor, a global positioning system (GPS) sensor, a touch sensor, and a grip sensor. The above-described sensors may be included in a device as separate elements, or may be incorporated into at least one element.

The display unit 1270 may display various images/videos. In particular, the display unit 1270 of the client device 1300 may display various web pages/UIs provided by the web server, various application screens/UIs provided by the application server, and the like.

The processors 1210 and 1240 may perform various embodiments proposed herein by controlling at least one other configuration unit. Thus, the performance subject of the embodiment disclosed herein may be replaced by a processor. The processors 1210 and 1240 may execute various programs/applications stored in the memory unit 1220 and process data/information inside the server/device. The processors 1210 and 1240 may be configured to include at least one of a central processing unit (CPU), a micro processor unit (MPU), a micro controller unit (MCU), an application processor (AP) or any type of processor well-known in the art. The processor may perform an operation of at least application or program for executing the method according to the embodiments of the present invention.

Figure 13:
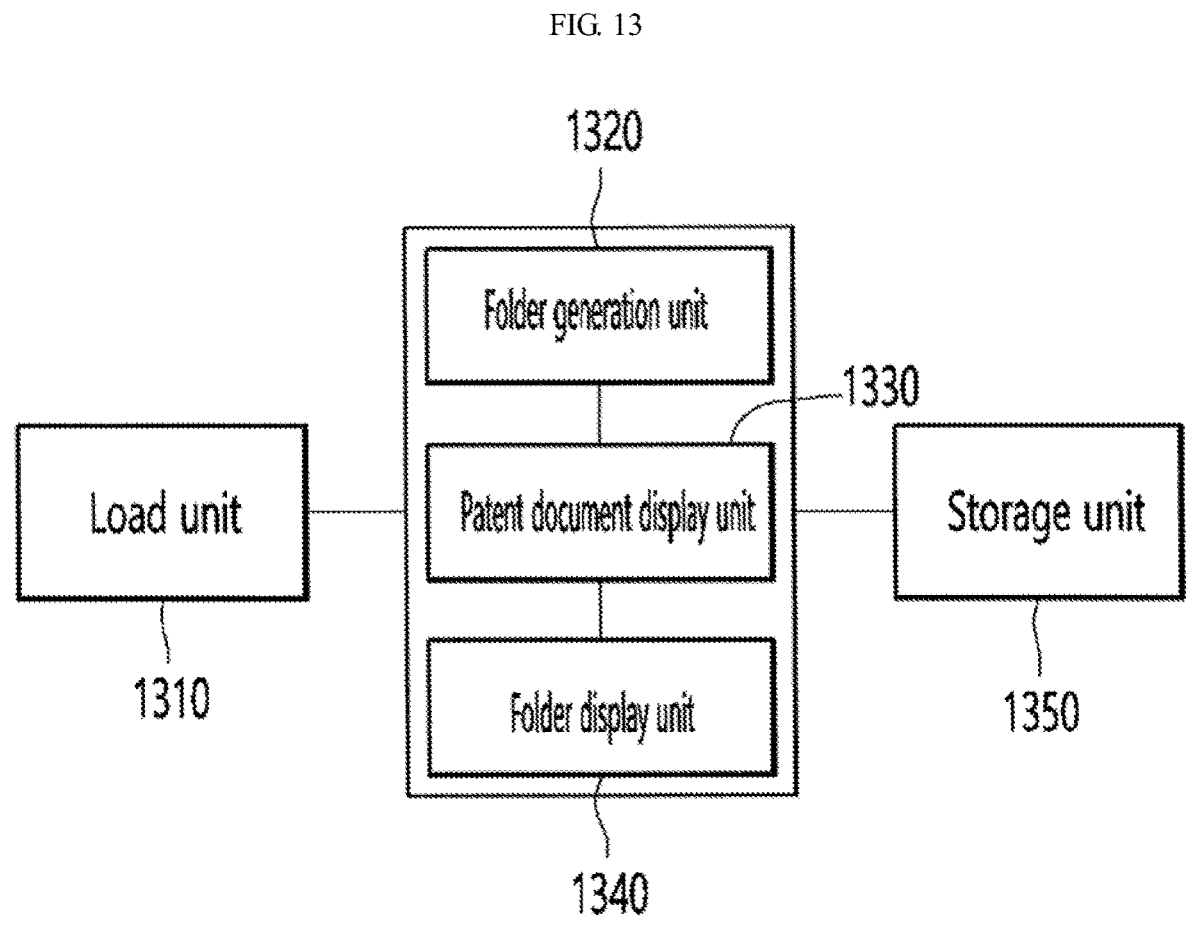

FIG. 13 is a diagram illustrating a block diagram of a patent document classification system according to an embodiment of the present invention.

The components of FIG. 13 may be implemented using at least one of the components illustrated in FIG. 12. For example, a load unit may be implemented by a processor, a memory unit, a folder generation unit, and a patent documentation display unit, a folder display unit may be implemented by a processor and a display unit, and a storage unit may be implemented by a memory unit, respectively.

The load unit 1310 may serve to load at least one patent document requested by the user. The load unit 1310 is connected to a storage space for storing various data, instructions, and/or information, and may store one or more applications for receiving a method for providing a patent classification service according to an embodiment of the present invention. The load unit 1310 may be received through a communication unit, or may also store various information input through user input.

The storage unit 1350 may temporarily or nontemporarily store data or the like transmitted from an external device. The storage unit 1350 may be configured to include non-volatile memories such as a read only memory (ROM), an erasable programmable ROM (EPROM), an electrically erasable programmable ROM (EEPROM), and a flash memory, a hard disk, a removable disk, or any type of computer-readable recording medium well-known in the art to which the present invention pertains.

The folder generation unit 1320 may serve to generate a folder for storing or classifying patent documents.

The patent document display unit 1330 serves to display at least one of distinction items in the patent document in an information area, and the folder display unit 1340 serves to display a folder in a folder area. The information area and the folder area are preferably separated areas.

In addition, the storage unit 1350 serves to store the patent documents in the folder according to a drag and drop input of the user by setting at least a part of the information area as a draggable area and setting at least a part of the folder area as a droppable area.

The embodiments of the present invention may be implemented by, for example, hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Further, in the case of implementation by firmware or software, the embodiment of the present invention may be implemented in the form of a module, a procedure, a function, and the like to perform the functions or operations described above and recorded in recording media readable by various computer means. Herein, the recording medium may include singly a program instruction, a data file, or a data structure or a combination thereof. The program instruction recorded in the recording medium may be specially designed and configured for the present invention, or may be publicly known to and used by those skilled in the computer software field. Examples of the recording media include magnetic media such as a hard disk, a floppy disk, and a magnetic tape, optical media such as a CD-ROM (Compact Disk Read Only Memory) and a DVD (Digital Video Disk), magneto-optical media such as a floptical disk, and a hardware device which is specifically configured to store and execute the program instruction such as a ROM, a RAM, and a flash memory. An example of the program instruction includes a high-level language code executable by a computer by using an interpreter and the like, as well as a machine language code created by a compiler. The hardware devices may be configured to operate as one or more software modules in order to perform the operation of the present invention, and an opposite situation thereof is available.

In addition, an apparatus or terminal according to the present invention may be driven by instructions that cause one or more processors to perform the functions and processes described above. The instructions may include, for example, interpreted instructions such as script instructions, such as JavaScript or ECMAScript instructions, executable codes or other instructions stored in computer readable media. Further, the device according to the present invention may be implemented in a distributed manner across a network, such as a server farm, or may be implemented in a single computer device.

In addition, a computer program (also known as a program, software, software application, script or code) that is embedded in the device according to the present invention and which implements the method according to the present invention may be prepared in any format of a compiled or interpreted language or a programming language including a priori or procedural language and may be deployed in any format including standalone programs or modules, components, subroutines, or other units suitable for use in a computer environment. The computer program does not particularly correspond to a file in a file system. The program may be stored in a single file provided to a requested program, in multiple interactive files (e.g., a file storing one or more modules, subprograms, or portions of code), or in a part (e.g., one or more scripts stored in a markup language document) of a file storing another program or data. The computer program may be located on one site or distributed over a plurality of sites to be executed on multiple computers or one computer interconnected by a communication network.

Although the drawings have been described for the sake of convenience of explanation, it is also possible to design a new embodiment to be implemented by merging the embodiments described in each drawing. Further, configurations and methods of the described embodiments may not be limitedly applied to the aforementioned present invention, but all or some of the respective embodiments may be selectively combined and configured so as to be variously modified.

Further, while the embodiments of the present invention have been illustrated and described above, the present invention is not limited to the aforementioned specific embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

The present invention may be applied to various patent search engine technology fields and/or machine learning technology fields.

What is claimed is:

1. A method for classifying patent documents using an automatic classification performed by a server, comprising the steps of:
identifying original patent documents in a patent pool identified according to a search or selection input of a user;
determining first patent documents classified in classifications generated by the user, among the original patent documents in the patent pool, wherein the number of documents to be at least classified for each classification is defined;
determining, for each classification generated by the user, an indication of accuracy related to the automatic classification, wherein the indication of accuracy is determined based on a result for classification performed by the user and based on at least one of (i) a number of classifications generated by the user, (ii) a number of the patent documents in the patent pool, (iii) a number of the first patent documents classified in the classification generated by the user, and (iv) a similarity of the first patent documents classified in the classification generated by the user;
outputting the indication of accuracy for each classification generated by the user;
when the accuracy is lower than a predetermined accuracy, outputting an alert for guiding the user to input more first patent documents in the classification generated by the user;
determining a classification selected by the user based on the accuracy of the classification; and
performing the automatic classification for second patent documents that are not yet classified, among the patent documents in the patent pool, for the classification selected by the user,
wherein the automatic classification is performed according to a classification request of the user.

2. The method for classifying patent documents using an automatic classification of claim 1, wherein the alert is repeatedly output until the accuracy is higher than the predetermined accuracy.

3. The method for classifying patent documents using an automatic classification of claim 1, wherein the classification generated by the user corresponds to a folder,
wherein the first patent documents are stored in the classification according to a request of the user.

4. The method for classifying patent documents using an automatic classification of claim 1, further comprising:
outputting alert for guiding the user to more generate the classification for the first patent documents by the user, when the accuracy is lower than predetermined accuracy.

5. The method for classifying patent documents using an automatic classification of claim 1, further comprising:
outputting a user interface for re-classification of the first patent documents, wherein the re-classification is performed by transferring the first patent document into other classification or by deleting the first patent document in the classification.

6. A server for classifying patent documents using an automatic classification, comprising:
a memory unit configured to store data;
a communication unit configured to perform communication using at least one protocol; and
a processor configured to control the memory unit and the communication unit,
wherein the processor is further configured to:
identify original patent documents in a patent pool identified according to a search or selection input of a user;
determine first patent documents classified in classifications generated by the user, among the original patent documents in the patent pool, wherein the number of documents to be at least classified for each classification is defined;
determine, for each classification generated by the user, an indication of accuracy related to the automatic classification, wherein the indication of accuracy is determined based on a result for classification performed by the user and based on at least one of (i) a number of classifications generated by the user, (ii) a number of the patent documents in the patent pool, (iii) a number of the first patent documents classified in the classification generated by the user, and (iv) a similarity of the first patent documents classified in the classification generated by the user;
output the indication of accuracy for each classification generated by the user;
when the accuracy is lower than a predetermined accuracy, outputting an alert for guiding the user to input more first patent documents in the classification generated by the user;
determine a classification selected by the user based on the accuracy of the classification; and
perform the automatic classification for second patent documents that are not yet classified, among the patent documents in the patent pool, for the classification selected by the user,
wherein the automatic classification is performed according to a classification request of the user.

7. The server of claim 6, wherein the alert is repeatedly output until the accuracy is higher than the predetermined accuracy.

8. The server of claim 6, wherein the first patent documents are stored in the classification according to a request of the user.

9. The server of claim 6, wherein the processor further is configured to:
output alert for guiding the user to more generate the classification for the first patent documents by the user, when the accuracy is lower than predetermined accuracy.

10. The server of claim 6, wherein the processor further is configured to:
output a user interface for re-classification of the first patent documents,
wherein the re-classification is performed by transferring the first patent document into other classification or by deleting the first patent document in the classification.

* * * * *